United States Patent [19]
Wilson

[11] Patent Number: 6,056,212
[45] Date of Patent: May 2, 2000

[54] LIQUID LINK SYSTEM

[76] Inventor: David H. Wilson, 7 Harvard Cir., Norristown, Pa. 19401

[21] Appl. No.: 09/249,264

[22] Filed: Feb. 12, 1999

[51] Int. Cl.⁷ .................................................... B05B 15/00
[52] U.S. Cl. ............................ 239/289; 239/391; 239/436
[58] Field of Search ....................... 239/390, 397, 239/391, 289, 587.1, 436; 137/561 A, 271

[56] References Cited

U.S. PATENT DOCUMENTS

| | | | |
|---|---|---|---|
| 1,168,219 | 1/1916 | Miller | 239/436 |
| 2,034,515 | 3/1936 | Hubbell | 239/391 |
| 2,069,667 | 2/1937 | Clawson | 239/391 |
| 2,148,535 | 2/1939 | Cone | 239/390 |
| 4,203,551 | 5/1980 | Levine | 239/289 |
| 4,850,532 | 7/1989 | Mackanos | 239/289 |
| 5,899,386 | 5/1999 | Miyasato et al. | 239/289 |

*Primary Examiner*—Andres Kashnikow
*Assistant Examiner*—Christopher S. Kim

[57] ABSTRACT

A liquid link system including a body portion having an upper surface and a lower surface and a water inlet recess extending upwardly from the lower surface to an intermediate location thereof with a swmall cylindrical aperture extending upwardly from the reccess to the upper surface. A threaded cylindrical member extends radially outwardly from the body portion with apertures as extension of the bores and with exterior male threads. A cap is removably positioned over each male thread. Each cap has primary female threads for removable positioning thereover and for removal to allow coupling by the inlet end of a hose. Further, the lip cap is positioned on the top of the central body with secondary female threades for detachably coupling to the threaded drive assembly post.

5 Claims, 3 Drawing Sheets

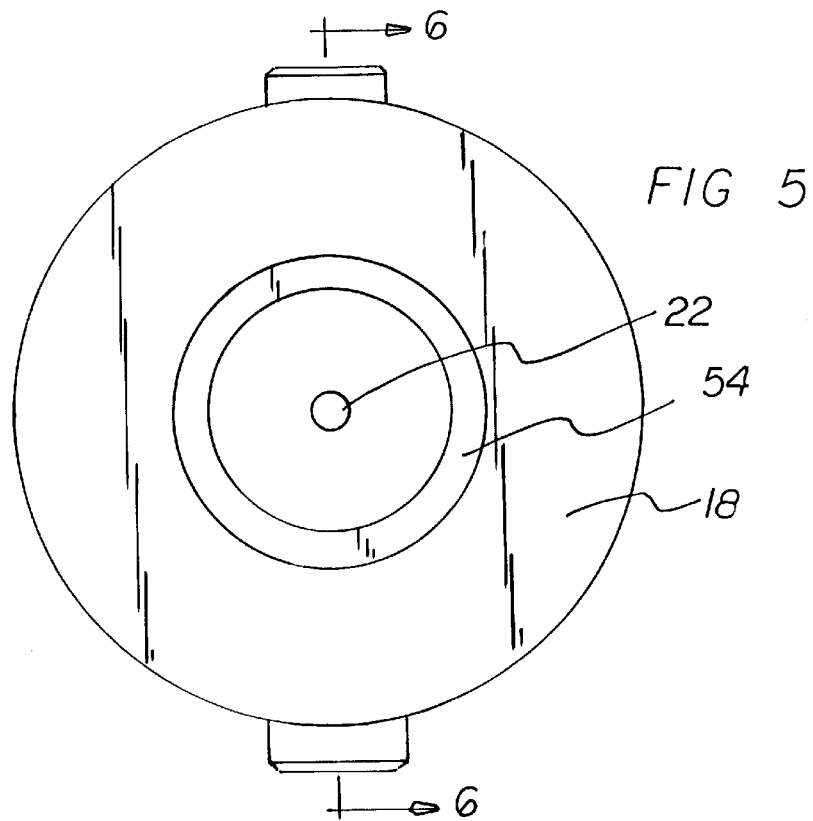
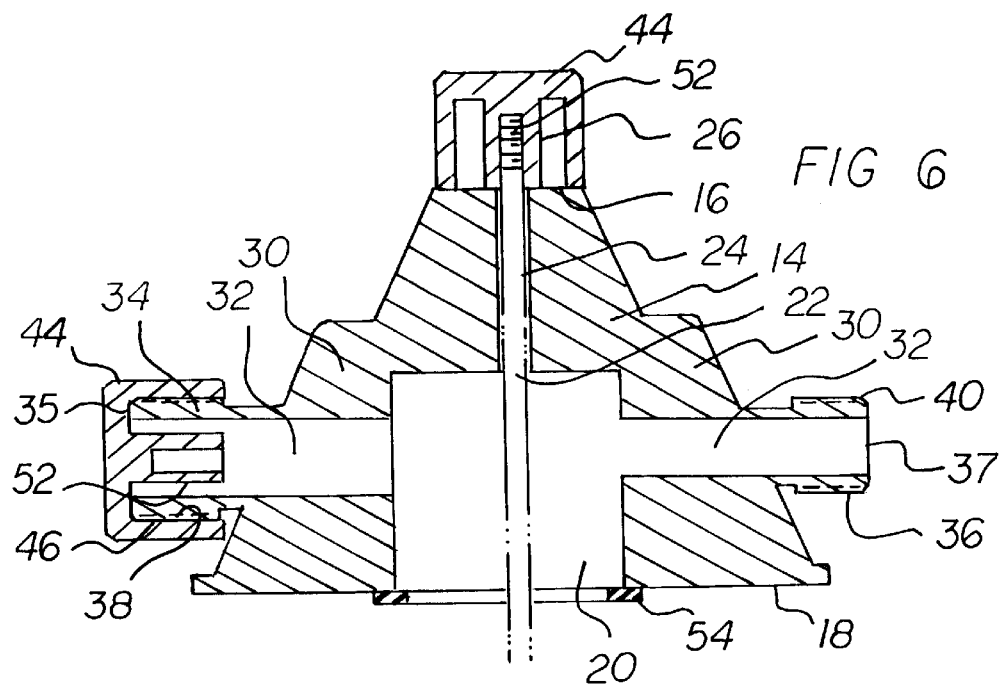

LIQUID LINK SYSTEM

BACKGROUND OF THE INVENTION

1. Field of the Invention

The present invention relates to a liquid link system and more particularly pertains to allowing the coupling of a hose to an existing sprinkler head.

2. Description of the Prior Art

The use of water handling devices of known designs and configurations is known in the prior art. More specifically, water handling devices of known designs and configurations heretofore devised and utilized for the purpose of coupling hoses to sources of water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,292,071 to Kruer discloses an In-Ground Pull-Up Sprinkler With Above Ground Hose Connection. U.S. Pat. No. 4,809,732 to Buehler discloses a Fitting For Cleaning Water From Fluid Containing Systems. U.S. Pat. No. 5,368,229 to Hayes et al. discloses an In Ground Pop-Up Sprinkler With Above Ground Hose Connection. U.S. Pat. No. 3,635,501 to Thorne-Thomsen discloses a Quick Connect-Disconnect Hose Coupling. U.S. Pat. No. 5,355,905 to Burgess et al. discloses an Underground Sprinkler System and Methods for Winterizing and Installing the Same. Lastly, U.S. Pat. No. 5,104,150 to Bard et al. discloses a Multiple Purpose Irrigation Fitting.

While these devices fulfill their respective, particular objectives and requirements, the aforementioned patents do not describe liquid links as disclosed herein.

In this respect, the liquid link according to the present invention substantially departs from the conventional concepts and designs of the prior art, and in doing so provides an apparatus primarily developed for the purpose of allowing the coupling of a hose to an existing sprinkler head.

Therefore, it can be appreciated that there exists a continuing need for a new and improved liquid link which can be used for allowing the coupling of a hose to an existing sprinkler head. In this regard, the present invention substantially fulfills this need.

SUMMARY OF THE INVENTION

In view of the foregoing disadvantages inherent in the known types of water handling devices of known designs and configurations now present in the prior art, the present invention provides an improved liquid link system. As such, the general purpose of the present invention, which will be described subsequently in greater detail, is to provide a new and improved liquid link system and method which has all the advantages of the prior art and none of the disadvantages.

To attain this, the present invention essentially comprises a new and improved liquid link system for allowing the releasable coupling of a hose to an existing sprinkler head. The system comprises, in combination a central body portion. The central body portion is in a generally cone-shaped configuration and has a flat upper surface and a flat lower surface and a water inlet recess. The water inlet recess extends upwardly from the lower surface to an intermediate location thereof. The water inlet recess has a small cylindrical aperture which extends upwardly from the recess to the upper surface of the cone-shaped member adapted to receive therein a pin from an existing sprinkler head with an upper end having male threads. Further included in the system is a pair of diametrically opposed blocks. The blocks are located on the exterior surface of the body portion for rigidity purposes. Each of the blocks have a generally cylindrical bore extending therethrough for coupling with the recess to exterior of the blocks. Additionally provided is a pair of threaded cylindrical members. The members extend radially outwardly from the blocks with apertures as extensions of the bores and with exterior male threads. One of the male threads being ¾" in diameter and the other being 1" in diameter. A cap is removably positioned over each male thread. Each cap has either ¾" or 1" primary female threads positioning thereover and for removal to allow coupling by the inlet end of a hose. Each cap is further positionable on the top of the upper flat surface of the central body with secondary female threads for detachably coupling to the drive assemble post. Lastly provided in the system is an annular gasket. The annular gasket is positioned on the lower surface of the cone-shaped member around the recess for water sealment purposes when coupled to a sprinkler head.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved liquid link system which has all of the advantages of the prior art water handling devices of known designs and configurations and none of the disadvantages.

It is another object of the present invention to provide a new and improved liquid link system which may be easily and efficiently manufactured and marketed.

It is a further object of the present invention to provide a new and improved liquid link system which is of durable and reliable constructions.

An even further object of the present invention is to provide a new and improved liquid link system which is susceptible of a low cost of manufacture with regard to both materials and labor, and which accordingly is then susceptible of low prices of sale to the consuming public, thereby making such liquid link system economically available to the buying public.

Even still another object of the present invention is to provide a liquid link system for allowing the coupling of a hose to an existing sprinkler head.

Lastly, it is an object of the present invention to provide a new and improved liquid link system including a central body portion having an upper surface and a lower surface and a water inlet recess extending upwardly from the lower surface to an intermediate location thereof with a small cylindrical aperture extending upwardly from the recess to the upper surface. A threaded cylindrical member extends radially outwardly from the body portion with apertures as extensions of the bores and with exterior male threads. A cap is removably positioned over each male thread. Each cap has female threads for removable positioning thereover and for removal to allow coupling by the inlet end of a hose. Further, the cap is positionable on the top of the central body portion with secondary female threads for detachably coupling to drive post assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a bottom view taken along line 5—5 of FIG. 3.

FIG. 6 is a cross-sectional view taken along line 6—6 of FIG. 5.

The same reference numerals refer to the same parts through the various Figures.

DESCRIPTION OF THE PREFERRED EMBODIMENT

Figure 1:
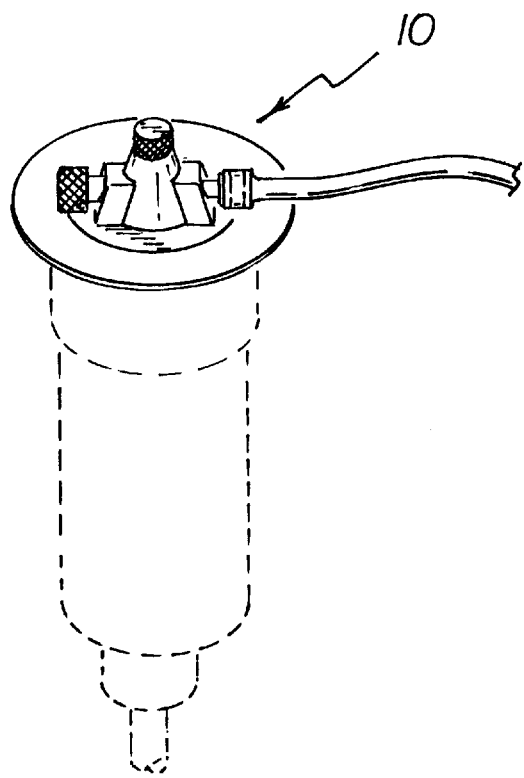
FIG. 1 is a perspective view of the preferred embodiment of the Liquid link constructed in accordance with the principles of the present invention.
Figure 2:
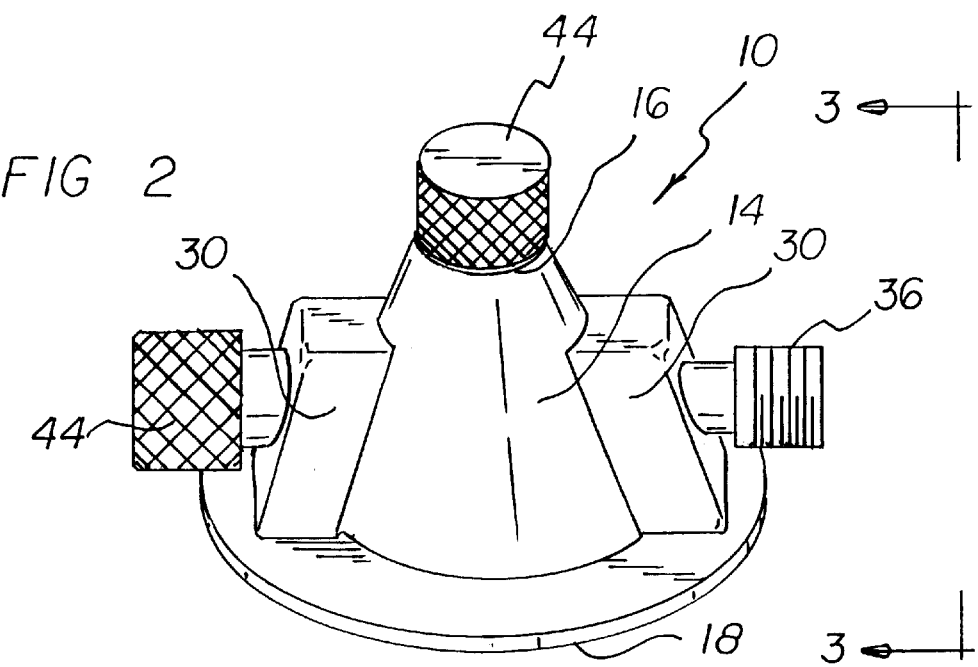
FIG. 2 is an enlarged perspective view of the liquid link shown in FIG. 1.
Figure 3:
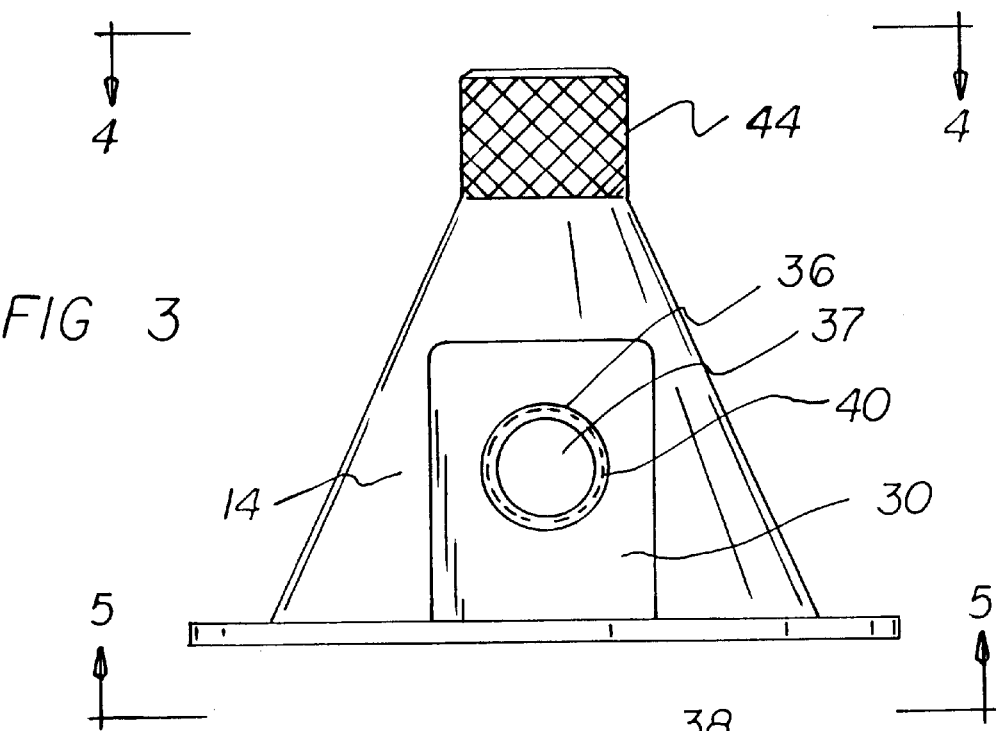
FIG. 3 is an end view taken along line 3—3 of FIG. 2.
Figure 4:
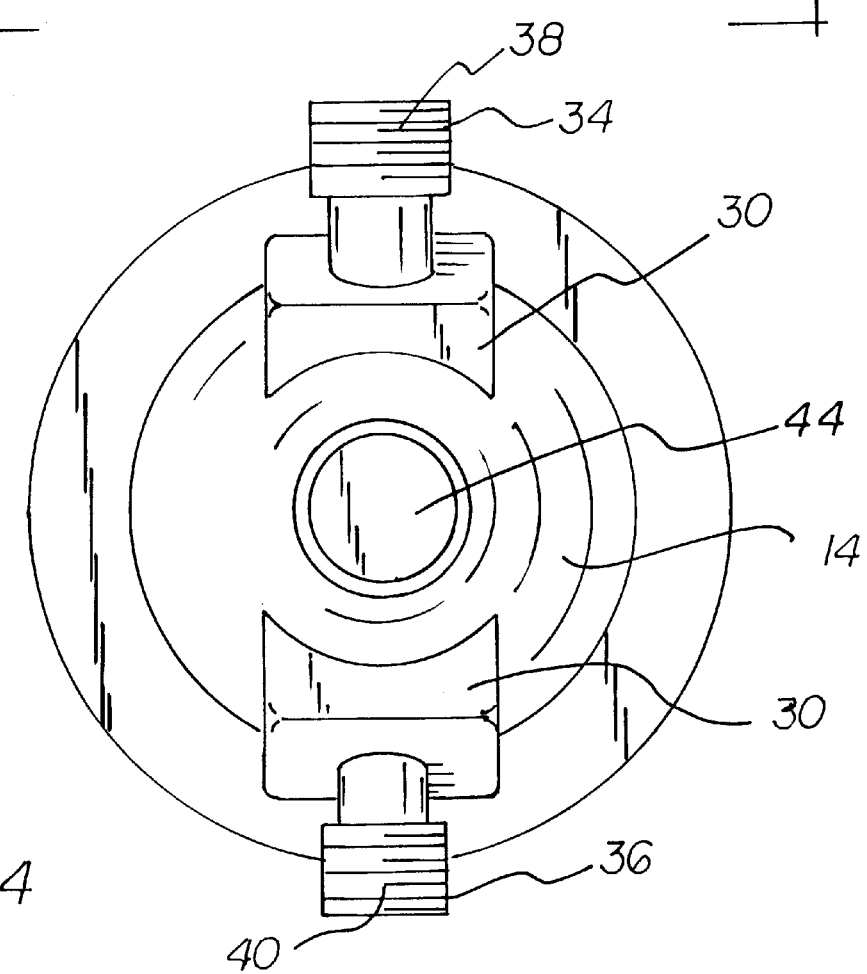
FIG. 4 is a top view taken along line 4—4 of FIG. 3.

With reference now to the drawings, and in particular to FIG. 1 thereof, the preferred embodiment of new and improved liquid link system embodying the principles and concepts of the present invention and generally designated by the reference numeral 10 will be described.

The present invention, of the liquid link system 10 is comprised of a plurality of components. Such components in their broadest context include a central body portion, a pair of blocks, a threaded cylindrical member, cylindrical aperture and a threaded lid cap. Such components are individually configured and correlated with respect to each other so as to attain the desired objective.

The new and improved liquid link system 10 for allowing the releasable coupling of a hose to an existing sprinkler head comprises, in combination a central body portion 14. The central body portion is in a generally cone-shaped configuration and has a flat upper surface 16 and a flat lower surface 18 and a water inlet recess 20. The water inlet recess extends upwardly from the lower surface to an intermediate location thereof. The water inlet recess has a small cylindrical aperture 22 which extends upwardly from the recess to the upper surface of the cone-shaped member adapted to receive therein a pin 24 from an existing sprinkler head with an upper end having male threads 26.

Further included in the system is a pair of diametrically opposed blocks 30. The blocks are located on the exterior surface of the body portion for rigidity purposes. Each of the blocks have a generally cylindrical bore 32 extending therethrough for coupling with the recess to exterior of the blocks.

Additionally provided is a pair of threaded cylindrical members 34, 36. The members extend radially outwardly from the blocks with apertures 35, 37 as extensions of the bores and with exterior male threads 38, 40. One of the male threads being ¾" in diameter and the other being 1" in diameter.

A cap 44 is removably positioned over each male thread 38, 40. Each cap has first female threads 46 for removable positioning thereover and for removal to allow coupling by the inlet end of a hose. Further, the cap is positionable on the top of the upper flat surface of the central body portion with second female threads 52 for detachably coupling to the threaded drive assembly post.

Lastly provided in the system is an annular gasket 54. The annular gasket is positioned on the lower surface of the cone-shaped member around the recess for water sealment purposes when coupled to a sprinkler head.

Golf courses, parks, farms and gardens that use underground sprinkler system usually have a few brass "quick couplers" which are used to connect to watering hoses to irrigate areas which the sprinklers do not reach. A problem arises wherein long lengths of hose are still needed to reach all those areas. This problem not only adds a large expense it is very time consuming when gardeners or maintenance workers have to drag these holes all over the place. While attempts have been made to connect hoses to the sprinkler heads themselves, they have been unsuccessful because the cap and nozzle assembly of existing sprinkler head is one unit. The drive fins on the drive assembly spin the entire cap and nozzle assembly counterclockwise to disperse water through the sprinkler nozzles. Therefore, it is impossible to adapt or connect any hose nozzles to the sprinklers because these nozzles would also have to spin or they would interfere with the sprinkler's drive assembly function. As a result, any hose that was attached would just get spun around and snarled up. The present invention overcomes this problem and has many unique features as discussed hereinabove.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is being new and desired to be protected by Letters Patent of United States is as follows:

1. A new and improved liquid link system for allowing the releasable coupling of a hose to an existing sprinkler head comprising, in combination:

a central body portion in a generally cone-shaped configuration having a flat upper surface and a flat lower surface and a water inlet recess extending upwardly from the lower surface to an intermediate location thereof with a small cylindrical aperture extending upwardly from the recess to the upper surface of the cone-shaped member adapted to receive therein a drive assembly post from an existing sprinkler head with an upper end having male threads;

a pair of diametrically opposed blocks on the exterior surface of the body portion for rigidity purposes, each of the blocks having a generally cylindrical bore extending therethrough for coupling with the recess to exterior of the blocks;

a pair of threaded cylindrical members extending radially outwardly from the blocks with apertures as extensions of the bores and with exterior male threads, one being ¾" in diameter and the other being 1" in diameter;

a cap removably positioned over each male thread, each cap having first female threads for removable positioning thereover and for removal to allow coupling by the inlet end of a hose, and the cap removably positionable on the top of the flat upper surface of the central body portion with second female threads for detachably coupling to the threaded drive assembly post; and an annular gasket positioned on the lower surface of the cone-shaped member around the recess for water sealment purposes when coupled to a sprinkler head.

2. A liquid link system for use with existing sprinklers having a threaded drive assembly post comprising:

a central body portion having an upper surface and a lower surface and a water inlet recess extending upwardly from the lower surface to an intermediate location thereof with a small cylindrical aperture extending upwardly from the recess to the upper surface;

a threaded cylindrical member extending radially outwardly from the body portion with apertures as extensions of the bores and with exterior male threads;

a cap removably positioned over each male thread, each cap having first female threads for removable positioning thereover and for removal to allow coupling by the inlet end of a hose, and removably positionable on the top of the flat upper surface with female threads for detachably coupling to the threaded drive assembly post.

3. The apparatus as set forth in claim 2 and further including an annular gasket positioned on the lower surface of the cone-shaped member around the recess for water sealment purposes when coupled to a sprinkler head.

4. The apparatus as set forth in claim 2 wherein the threads on the cylindrical are ¾ inch and 1 inch in diameter.

5. A liquid link system for use with existing sprinklers having a threaded drive post, comprising:

a central body portion having a water inlet;

a threaded member extending outwardly from the body portion with internal with exterior male threads;

a cap removably positioned over each male thread, each cap having first female threads for removable positioning thereover and for removal to allow coupling by the inlet end of a hose, and removably positionable on the top of central body with female threads for detachably coupling to a threaded drive assembly post.

\* \* \* \* \*